United States Patent [19]

Bleiker

[11] 4,455,095

[45] Jun. 19, 1984

[54] SYSTEM FOR MEASURING THE HEAT ENERGY EMISSION OF ROOM HEATING ELEMENTS

[76] Inventor: Werner Bleiker, Hafenstrasse 16, D-4354 Datteln, Fed. Rep. of Germany

[21] Appl. No.: 260,966

[22] Filed: May 6, 1981

[30] Foreign Application Priority Data

May 8, 1980 [DE] Fed. Rep. of Germany ....... 2857217

[51] Int. Cl.³ .............................................. G01K 17/10
[52] U.S. Cl. ...................................... 374/39; 374/110; 364/557
[58] Field of Search .................... 73/15 R, 190, 193 R; 364/510, 557; 374/101, 110, 39

[56] References Cited

U.S. PATENT DOCUMENTS 3,979,952  9/1976  Bornstein et al. ...................... 73/193
4,221,260  9/1980  Otala et al. ............................. 73/193

Primary Examiner—Herbert Goldstein
Attorney, Agent, or Firm—Allison C. Collard; Thomas M. Galgano

[57] ABSTRACT

A system and method for measuring the heat emission of space heaters includes an input device for selectively inputting special heater constants $Q_N$ and n, which are characteristic space heaters associated therewith. The device is coupled to a processor which, in operation, receives the temperature values $T_V$, $T_R$ and $T_i$ sensed by a supply temperature sensor, a return temperature sensor, and an ambient temperature sensor. A timer provides the clock signal for the processor. The processor develops an output representing a quantitative measure for the heat consumption of the associated heater from the preadjusted characteristic constants, $Q_N$ and n, and the sensed temperature values, $T_V$, $T_R$ and $T_i$. The processor is programmed so as to also serve as correction device for automatically correcting any throttle states of the heater in operation.

12 Claims, 4 Drawing Figures

SYSTEM FOR MEASURING THE HEAT ENERGY EMISSION OF ROOM HEATING ELEMENTS

FIELD OF THE INVENTION

The invention generally relates to the measuring of heat emission of room heating elements and, in particular, to a system for measuring the heat emission of room heating elements, wherein the supply and return temperatures of the heating elements and the room temperature (heating element-ambient temperature) are measured, and by taking into consideration a predetermined heating element capacity, the heat quantity emitted from the heating element is determined and indicated.

STATE OF THE ART

Hitherto, the quantitative measuring of the heat energy emission from a heating element into an enclosed space was only possible with so-called heat quantity counters U.S. Pat. No. 3,301,049). In the heat quantity counters, the product of water quantity and temperature difference is measured between the heat element supply line and the return line. However, such heat quantity counters are expensive devices, since very expensive throughput measuring devices must be mounted on each heating element in addition to the temperature sensors.

It is the main object of the invention to provide a system with which it is possible to measure the heat energy emission of room heating elements and to indicate it understandably to a user.

It is a further object of the invention to provide a system for measuring and indicating the heat energy emission of room heating elements, whereby the continous measuring may be performed with simple and inexpensive temperature without interfering with the operation medium cycle.

It is a particular object of the invention is to process measuring values of the supply and return temperature of the heating elements and the room temperature (heating element-ambient temperature) in a suitable programmed microprocessor so that the heating energy emission of the heating element itself or of the associated heating element may be quantitatively controlled, even at extremely low heating medium throughput quantities in the heating element.

It is a further object of the invention to provide a system which is able to be adjusted to any given embodiments of room or space heating elements and even surface heaters with a low installation expense, and which enables an exact and appropriate heating expense distribution is provided, even with different room heating elements or space heaters.

The invention is based on the consideration that when testing room heating elements or space heaters in accordance with DIN 4704 (DIN-German Industrial Standard), the method used thereby, as well as the obtained values for the standard heating capacity $Q_N$ of the heating element and for the heating element exponent n may also be used for obtaining the heat emission of these tested heating elements in actual operation.

THEORETICAL BASIS OF THE INVENTION

The following dimensions are defined:

$T_i$ = room air temperature (heating element-ambient temperature)

$T_V$ = heating element-supply temperature.

$T_R$ = heating element-return temperature $\Delta T_N$ = arithmetic excess temperature from the test temperatures $\Delta T$ = logarithmic excess temperature $Q_N$ = Standard testing capacity of the heating element in accordance with the manufacturer's table Q = heating element capacity $\dot{Q}$ = heat emission of the heating element $t_0$ = start of measuring $t_x$ = end of measuring n = heating element exponent per test (manufacturer's table).

b = 60 ± 2 c = 9 ± 1

$$\Delta T_k = \frac{1}{b - \frac{T_v - T_R}{c}}$$

The heat rating or capacity test of heating elements in accordance to DIN 4704 is obtained by measuring the supply and return temperatures and the heating medium flow within the room heating element. This results in a characteristic curve of $\dot{Q}$ over $\Delta T$ from which the heating element exponent n can be calculated. This exponent n differs from heating element type to heating element type and is between 1.1 and 1.5. The given numerical value of n should be taken from the test report of the heating rating for the heating element.

For the heat capacity of a heating element the following equation is applicable in accordance with DIN 4703:

$$\dot{Q} = \dot{Q}_N \left(\frac{\Delta T}{\Delta T_N}\right)^n = \frac{\dot{Q}_N}{\Delta T_N{}^n} \Delta T^n \tag{1}$$

From the known dimensions from equation (1) having been established during the previous heating element test, the inventor has determined as a heating constant K the following:

$$K = \dot{Q}_N/(\Delta T_N)^n \tag{2}$$

The logarithmic excess temperature is:

$$\Delta T = \frac{T_V - T_R}{\ln\left(\frac{T_V - T_i}{T_R - T_i}\right)} \tag{3}$$

The heat emission of a room heating element to its environment in the time $t_0 - t_x$ is therefore $$Q = K \int_{t_0}^{t_x} \Delta T^n dt \tag{4}$$

SUMMARY OF THE INVENTION

The inventive system for measuring the heat energy emission of room heating elements provides, as the variable measuring dimensions, the supply and return temperatures $T_V$ and $T_R$ of the heating element and the room air temperature or heating element ambient temperature $T_i$ as measured by the temperature measuring sensors. In addition, the system has a first input step for a predetermined first characteristic dimension ($Q_N$ or K) provided by the manufacturer and also a known associated heating element exponent n provided by the manufacturer's table. From the temperature measuring values the logarithmic temperature mean value ΔT is formed in accordance with equation (3), increased by the heating element exponent n, and integrated over time in a computer which preferably contains a microprocessor, for example, the microprocessor SAA 6000 made by ITT. The output signal of the microprocessor is a quantitative measure for the heat emission of the associated room heating element corresponding to the aforementioned equation (4) and can be understandably indicated to the user in suitable heat energy units, for example, kWh, by means of an indicator device, for example, a digital indicator which is, sequentially switched to the microprocessor. The necessary temperature sensing sensors are inexpensive components as far as their manufacturing and installation is concerned. They can be coupled to the microprocessor by means of an analog/digital converter. The A/D converter, as well as the microprocessor and the digital indicator may be produced according to integrated circuit technology and are therefore also very inexpensive structural elements. The same is true for the digital indicator which may be a liquid crystal indicator which requires a very low energy consumption.

Due to today's use of thermostatic heating element values it has to be taken into consideration that the heating element exponent n is not only dependent on the type of the heating element, but that it can change during the operation depending on the heating medium flow. This consideration is taken into account in accordance with the invention by providing a correction device for the computer which is controlled by a control signal, which is dependent on the difference of the supply and return temperatures $T_V - T_R$. This correction device increases the output signal, which represents the heat emission as a function of the control signal with a decreasing heating medium throughput quantity within the heating element. A particularly simple empirical correction for the heating medium flow consideration is obtained with the following equation:

$$\dot{Q} = \dot{Q}_N \cdot \left( \frac{1}{b - \frac{T_V - T_R}{c}} \right)^n \left( \ln \frac{T_V - T_i}{T_R - T_i} \right)^n = \dot{Q}_N \left( \frac{\Delta T}{b - \frac{T_V - T_R}{c}} \right)^n \quad (5)$$

The fixed values b and c stated in equation (5) are permanently programmed into the microprocessor, and have the following numerical dimensions:

b=60±2 [°K.]
c=9±1.

A very exact quantitative measurement was obtained when using the empirical function in accordance with the equation (5) during all the throttle conditions of the heating element, that is, in all heating medium throughput quantities with the following values b=60.1
c=9.

In the following the invention will be explained in conjunction with a preferred embodiment. Although, the invention will be explained in the following with respect to one individual heating element and system indicating the heat emission therefrom, however it is to be understood that also a plurality of heating elements may be associated with a system having a computer and a common indicator. The connection between the computer or the microprocessor and the indicator device may be made through line connections or a wireless manner through radio contact.

DETAILED DESCRIPTION OF THE DRAWING

Figure 1:
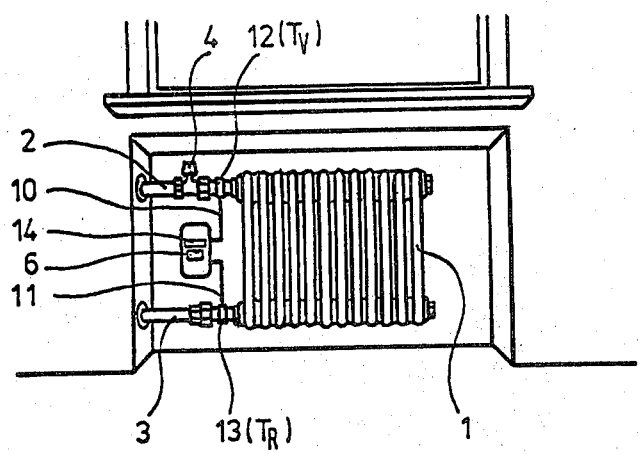
FIG. 1 is a schematic view of an inventive device for measuring and indicating the heat emission of room heating elements, the device being associated with a room heating element.

FIG. 1 shows the inventive device for measuring and indicating the heat emission of room heating elements, the device being associated with a room heating element or space heaters 1. The room heating element 1 is connected to the heating medium cycle by means of a supply line 2 and a return line 3. A thermostatic heating element valve 4 is mounted in the supply line with which the heating medium flow may be regulated, so as to adjust the room air temperature. The device 6, which can be installed at any given place of the room, or even outside of the room, is coupled by means of lines 10 and 11 with a sensor 12 which scans the supply temperature $T_V$, and a sensor 13 which scans the return temperature $T_R$. The sensors 12 and 13 may be provided as simple contact sensors and may contain known temperature dependent semiconductors or resistor structured units. The sensor which measures the room air is integrated in the housing of device 6. Also, a digital indicator 14 is built into the housing which is readable from the outside and transmits an understandable indication to the user of the heat energy emitted from the heating element 1. The device 6 can be installed in a few minutes and assures an exact energy consumption control without interfering with the heating medium system.

Figure 2:
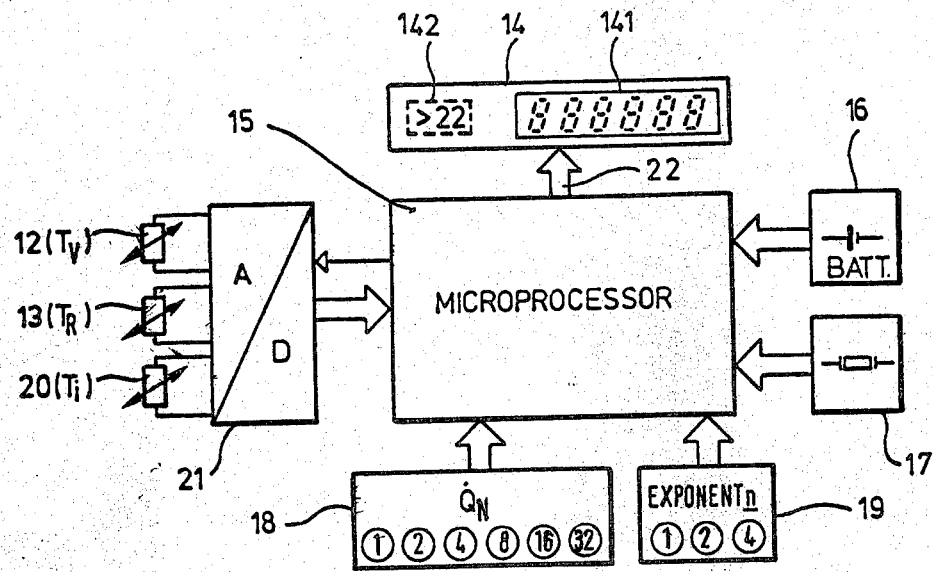
FIG. 2 is a block diagram of the device as shown in FIG. 1.

FIG. 2 shows the basic structure of the system for controlling the the energy consumption or the heat emission of heating element 1 in a block diagram.

The heart of this system or the device 6 is a microprocessor 15 which is fed from a current supply in the form of a battery, for example, and is cycled by a timer 17.

During the installation of device 6, the standard heat capacity of heating element 1, which is taken from the manufacturer's table, is fed into a first input stage. This first input stage is adjustable, depending on the size of the heat element and the type of the heat element, in the shown embodiment in 64 steps, between the mean values of 300–8360 (Watt). A particular embodiment of the input stage 18 with 64 adjustment steps is described further below in conjunction with FIG. 3. The heating element exponent n is adjusted in eight steps between 1,14 and 1,42 by a second input stage 19, according to previous tests conducted on heat element 1.

The process variables namely, the supply temperature $T_V$, the return temperature $T_R$ and the room air temperature $T_i$ are measured in an analog manner by the temperature sensors 12,13 and are fed into the microprocessor through an analog/digital converter 21, so that they can be temporarily stored as temperature proportional digital dimensions and processed by the microprocessor.

The microprocessor is so programmed that it performs the following calculations:

i: Calculation of $\Delta T$ from the process variables $T_V, T_R$ and and $T_i$ in accordance with equation (3);

ii: Development of a correction dimension as a function of the difference of the supply and return temperatures $T_V - T_R$ taking into consideration the throttle condition of the thermostatic valve 4;

iii: Calculation of equation (5) using the programmed values for b and c, of the heating element constants $Q_N$ and n, as well as the process variables $T_V, T_R$ and $T_i$ which are fed through input steps 18 and 19; and, iv: Development of an output signal as a quantitative dimension of the heat energy emission of the heating elements 1 by integrating the equation (5) over time.

The output signal of microprocessor 15 is fed through a collective output 22 to the indicating device 14, which indicates the heat emission in a numbering field or numeric display 141, and is especially controlled by the microprocessor at a particularly high room air temperature $T_i \geq 22°$ C., so that a warning signal appears in a second field 142 in the form of a flashing indication, for example.

The input of $\dot{Q}_N$ is performed in the described embodiment by a dual circuit which is directly coupled with the microprocessor 15, whereby the line path of a binary circuit may be closed in six places with the assistance of conductive rubber plugs. The six line paths of the binary circuit correspond to six numbers of the dual system, so that about 64 different adjustments may be carried out through the binary circuit. A corresponding device is provided at the input stage 19 for adjusting the heating element exponent n, wherein three switches must be selectively actuated with the assistance of conductive rubber plugs for adjusting eight different values. The input of the heat element constants must be performed during the installation and it must be assured that the user cannot manipulate it since they are integrated into the preadjustment for the measuring result. Therefore, the conductive rubber plugs are not accessible from the outside, but are mounted in a sealed housing of the device 6.

Figure 3:
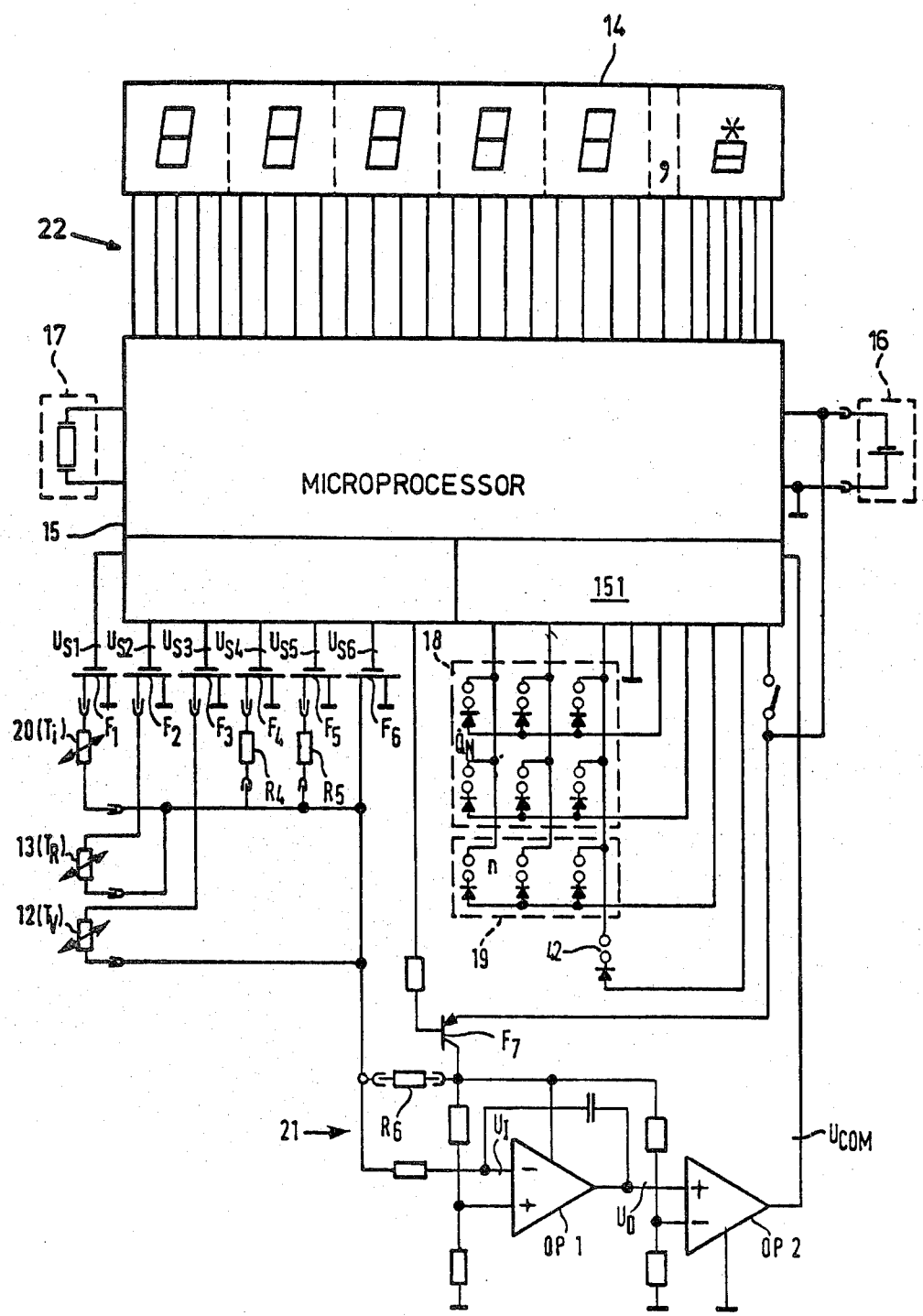
FIG. 3 is a circuit diagram of a preferred embodiment of the invention.

FIG. 3 shows the circuit diagram of the system, in particular, the one of the A/D converter 21 and the input stages 18 and 19, while the microprocessor is shown as a block.

The A/D converter is only shown partially in FIG. 3; the shown structural units of the A/D converter are in reciprocal action with components of the microprocessor for converting the analog temperature measuring values into digital signals, whereby the digital measuring signals are generated in the microprocessor in the described embodiment.

The measuring signals which arrive from the measuring sensors 20,13 and 12 are processed in a cycle with the assistance of a dual-slope-method in the portion of the A/D converter 21 which is shown in FIG. 3.

The temperature sensors 20,13 and 12, which are in form of precision resistors together with two reference resistors $R_4$ and $R_5$ are coupled to the negative input of a first operation amplifier OP1 which acts as an integrating step by means of field effect transistors $F_1, F_2, F_3, F_4, R_5$. The field effect transistors $F_1 \ldots F_5$ are coupled to a ground with their other connection. The gates of the field effect transistors $F_1 \ldots F_5$ are separately controlled by the microprocessor through separate control lines during the measuring cycle. An output signal $U_O$ is created as the output of OP1 which shows the charge condition of OP1, and which is coupled to an input of an operational amplifier OP2 which acts as a comparator. The operational amplifier OP2 develops a pulse signal at the output, the individual pulses of which are scanned at $U_O$ when reaching a defined threshold value and are switched off at $U_O$ when the value falls below another threshold value. The shifting of integrator OP1 is performed with the assistance of a further field effect transistor $F_6$ which is coupled to the positive connection of the current supply or battery 16 by means of a compensating resistor $R_6$ and a field transistor $F_7$. The other resistors and condensors which are shown in the dash-dot-lined block 21 in FIG. 3, have known functions and will not be described in detail, so as not to unnecessarily burden the description of the invention.

Figure 4:
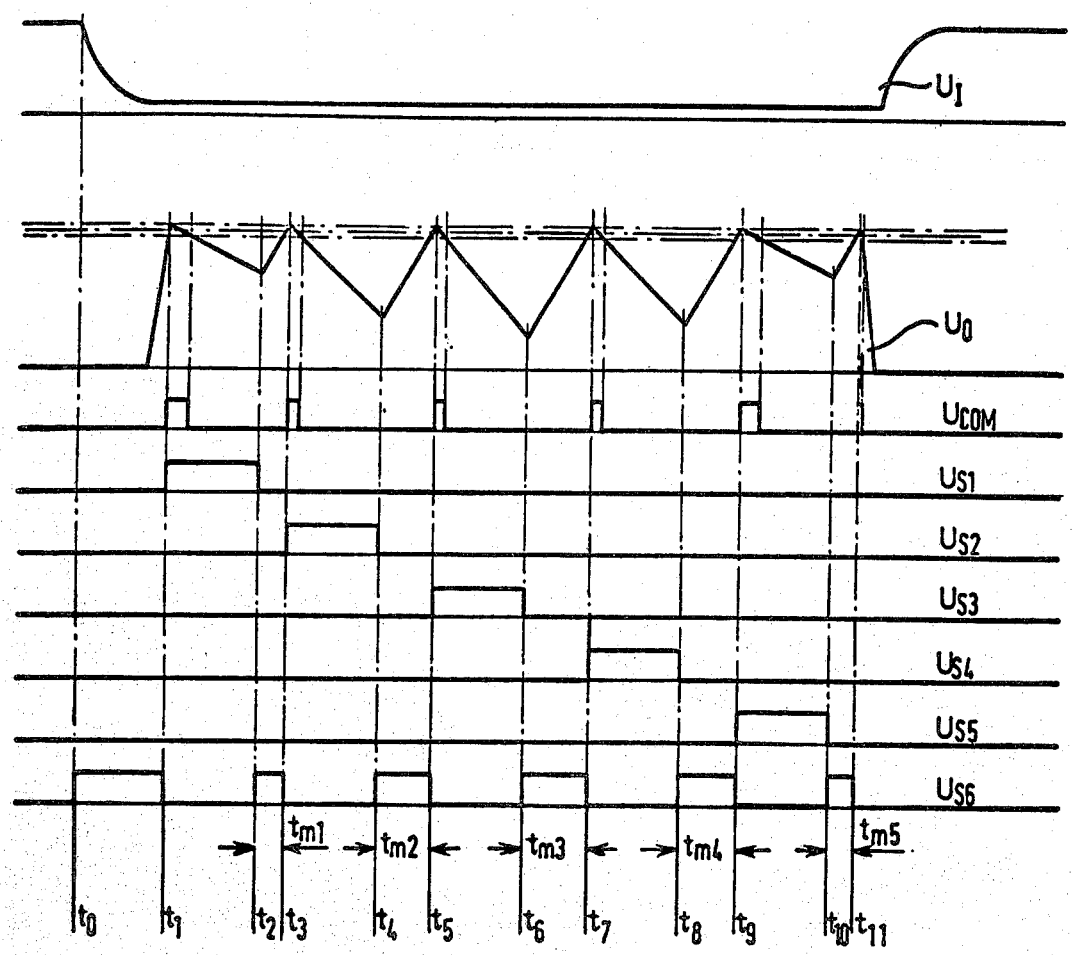
FIG. 4 is a timing diagram showing the input of the different measuring temperatures through an A/D-converter in a predetermined measuring time cycle.

In the following, the function of the A/D converter 21 is explained in detail in conjunction with FIG. 4 which shows a series of time diagrams, which represent the path of the signals or voltages at different nodal points in the A/D converter during a measuring cycle $t_0 \ldots t_{11}$.

The measuring cycle starts at the time $t_0$, wherein $F_7$ is controlled by microprocessor 15 and $U_I$ is shifted by OP1 at the input. Simultaneously, the gate of $F_6$ is also controlled by the microprocessor, that is, $U_{S6}$ is between $t_0$ and $t_1$ on an H-level. $U_O$ at the output of OP1 increases to a predetermined threshold value at which the compactor, which is formed by OP2, switches and develops an output signal $U_{COM}$ on an H-level. The microprocessor 15 periodically scans the output of OP2, due to the time cycle of the timer 17, and develops a first control pulse $U_{S1}$, on the gate of $F_1$, as soon as ($t_1$) $U_{COM}$ is switched to "1". Through control pulse $U_{S1}$, $F_1$ becomes conductive at the integrator OP1 and is discharged with a current through the precision resistor 20, wherein the current is dependent from the value of the precision resistor 20, that is, from the room or ambient temperature $T_i$. The control pulse $U_{S1}$ is scanned over a constant time. During a level change from $U_{S1}$ to "0", OP1 is shifted with a control pulse $U_{S6}$ by controlling $F_6$ until the upper threshold value of $U_O$ is reached ($t_3$). At this time a further pulse $U_{COM}$ is developed on the output of OP2 and fed into the microprocessor 15. It can be seen that the charge time of OP1 is between the time points $t_2$ and $t_3$ proportional to the dimension of the discharge during the presence of control pulse $U_{S1}$, that is, proportional to the increase of $U_O$ in the discharge interval $t_2 - t_1$. Therefore, the charge interval $t_3 - t_2$ is a measure of the value of the precision resistor 20 and, during a linear measuring behavior, a measure for the room air temperature $T_i$. Therefore, the interval $t_3 - t_2$ is the first measuring interval $t_{m1}$. In the same manner, the precision resistor 13 ($T_R$) and 12 ($T_V$), as well as the reference resistors $R_4$ and $R_5$ are scanned in subsequent recharging of OP1 being controlled by the microprocessor 15, and thereafter the measuring intervals $t_{m2}, t_{m3}, t_{m4},$ and $t_{m5}$ are scanned until the end of the measuring cycle at the time $t_{11}$. Here, the field effect transistors $F_2$ to $F_5$ are consecutively controlled with constant control pulses $U_{S2}$ to $U_{S5}$. The measuring impulse $t_{m1} \ldots t_{m5}$ are pulse permanent modulated pulses, the pulse duration of which is exactly proportional to the resistors 20,13,12,R$_4$ or R$_5$, which discharge the integrator OP1. The resistors R$_4$ and R$_5$ are reference resistors which correspond to a predetermined reference temperature of, for example, 60° and 0° C. Consequently, the system can calibrate itself and many errors due to manufacturer's tolerances of the used construction units and temperature drift are eliminated or at least substantially compensated. The pulse duration U$_{S6}$ in the measuring intervals t$_{m1}$ ... t$_{m5}$ is temporarily stored in the microprocessor with the assistance of a suitable register and is coupled, after a suitable conversion in accordance with equation (5) and integrated over time, as an output signal to lines 22 or the indicator device 14, respectively. The temperature difference T$_V$−T$_R$ (measuring intervals t$_{m3}$−t$_{m2}$) represents a useable value for the throttle consideration of the heating element 1 or the heating medium throughput quantity which is used in the correction device 151 in microprocessor 15 in accordance with equation (5) for the empirical correction of the changing heating element exponent n during a severe throttling.

The input devices 18 and 19 for feeding the heating element constants Q$_N$ and n which are taken from the manufacturer's table based on the testing procedure are shaped as a diode matrix; the line paths to the individual diodes are, as already mentioned above, closeable with the assistance of one each conduct rubber plug in accordance with a usual binary code. For switching on the flashing indicator 142 one can close the line path 42 with the aid of a conductive rubber plug.

It should be noted that the described embodiment of the A/D converter 21 and the input stages 18 and 19 is only one embodiment; a person skilled in the art understands that other embodiments of A/D converters and other steps of conversion of the analog fed process variables T$_i$,T$_R$ and T$_V$ may be processed by the microprocessor 15 into digital dimension, as well as that it is possible to provide a different type of input of the heating element characteristics $\dot{Q}_N$ and n. However, care should be taken that the precision resistor 20 for measuring the heating element ambient temperature or the room air temperature T$_i$, as well as the input means for input stages 18 and 19 are mounted in a manipulation save manner in the housing of device 6, for example.

The correction of the value of heat capacity $\dot{Q}$ of heating element 1 and thereby the heat energy emission Q, taking into consideration the throttle condition of valve 4, is particularly easy to perform in microprocessor 15, when using the empirical equation in accordance with equation (5). When using the preferred values for dimensions b and c, the equation (5) to be processed in the microprocessor becomes equation $$\dot{Q}^* = \dot{Q}_N \cdot \left( \frac{\Delta T}{60.1 - \frac{T_V - T_R}{9}} \right)^n \quad (5a)$$

The described system delivers a quantitative, for example, digital consumption indication of the heat quantity emitted from the coupled heating element 1. Thereby, the consumer has an immediate and current control of the heat energy consumption. The possibility offered by the system is important above all when many consumers are connected to one common heat source, for example, in apartment buildings or multi-family homes, so as to obtain a correct heat expense distribution. The inventive system does not require any connection to a power supply, but may be supplied by its own power source, for example, a battery. The scanning of the temperature measuring values (FIG. 4), may occur in measuring cycles which have long spaces between each other, since in the practical application one does not expect rapid temperature jumps in the measured temperatures. Therefore, the described system has a very low electric power consumption, so that a battery has a life span of 2 heating periods (2 years), for example.

The inventive device need not be used only with room heating elements but also in surface heating, for example, floor heating, wherein the supply and return temperatures are measured with a suitable room temperature, for example, be brought into an equation with the temperature of a reference room.

I claim:

1. A system for defining the heat emission of at least one heating element which is provided with a supply for the heating medium and a return for the heating medium, the system comprising:
    (a) a plurality of temperature measuring sensors including a first sensor for measuring the supply temperature T$_v$, a second sensor for measuring the return temperature T$_R$, and a third sensor for measuring the room or ambient temperature T$_i$ which is influenced by the heat emission of the heating element;
    (b) input devices for a selective input of multiplier constants representing said heating element capacity $\dot{Q}_N$ and an exponent n which represents the change in heating element capacity;
    (c) a timer for producing a time cycle; and
    (d) a computer coupled to said temperature measuring sensors, the input devices and said timer, and which combines the measured temperature values and the two heating element constants and integrates the time derived from the timer so that the output of the computer provides a quantitive measure for the heat emission of the heating element.

2. The system in accordance with claim 1 additionally including an indicating device coupled to the output of said computer, said indicating device having means for indicating a numerical value Q proportional to the heat energy emitted from the heating element.

3. The system in accordance with claim 1, wherein said computer includes means for sensing the temperature measured values T$_V$,T$_R$, and T$_i$ in a cycle in dependency from said timer and for temporarily storing these values in a suitable register.

4. The system in accordance with claim 1, wherein said computer includes a correction device which develops a control signal dependent on the difference between the supply and return temperatures T$_V$−T$_R$, and that the signal which represents the heat emission of the heating element as a function of said control signal increases the heating element exponent n with a decreasing heating medium throughput quantity.

5. The system in accordance with claim 4, wherein said computer includes a programmable processor and that said correction device coupled to the processor provides a correction signal $\Delta T_K$ dependent on the difference between the supply and return temperatures T$_V$−T$_R$, as well as from the fixed values b=60±2 and c=9±1 in accordance with the equation $$Q = \dot{Q}_N \int_{t_o}^{t_x} (\Delta T_k)^n \cdot (\Delta T)^n dt$$

whereby the processor is so programmed that it processes the temperature measuring values $T_V, T_R, T_i$ into a logarithmitic excess temperature $\Delta T$ in accordance with the equation $$\Delta T = \frac{T_V - T_R}{\ln \frac{T_V - T_i}{T_R - T_i}}$$

increasing $\Delta T$ and $\Delta T_K$ with the selectively fed heating element exponent n, multiplied with the selectively fed heating element constant $Q_N$ and integrated over time, so that the output of the processor fulfills the following condition:

$$Q = \dot{Q}_N \int_{t_n}^{t_x} (\Delta T_k)^n \cdot (\Delta T)^n dt,$$

whereby Q is proportional to the heat energy emitted from the heating element to the environment.

6. The system in accordance with claim 5, wherein the processor has a memory in which the fixed values $b=60.1$ and $c=9$ are programmed.

7. The system in accordance with either claims 1 or 5, wherein said input devices are each formed as a switch-diode-matrix, whereby each switch in each input device corresponds to a binary number and by actuating at least one of said switches of the matrix a defined number is preadjustable corresponding to the value of the heating element constants $Q_N$ or n, respectively.

8. The system according to claim 5, comprising an analog/digital converter, and said temperature sensors are temperature dependent resistors and are coupled in parallel to each other with the analog input of said analog/digital-converter, a sensing circuit controlled by the processor and coupled to the input unit of the analog/digital-converter for sequentially sensing in a measuring cycle the temperature values of the temperature dependent resistors and wherein the cyclical sensed temperature measured values are temporarily stored in registers of the microprocessor before being processed into measuring signal Q.

9. The system in accordance with claim 8, wherein said analog/digital-converter is provided with a series circuit comprising an intergrating step and a comparator step, through so that by shifting the integrated step into a signal which is proportional to the dimension of the precision resistor for measuring, a saw tooth shape signal is provided which is converted in the comparator step into a pulse spacing modulated pulse sequence and wherein the microprocessor converts the output signal of the comparator step into a series of binary measuring pulses the length of which are proportional to be measured temperature.

10. The system according to claim 1, comprising a power unit having at least one battery for supplying current to the computer and the components coupled thereto.

11. The system in accordance with claim 1, wherein said temperature measuring sensors are feed sensors for sensing the supply and return temperatures $T_V$ and $T_R$ which are held in contact on the outside of the associated supply and return lines.

12. A method for determining and indicating the heat quantity emitted from a heating element to its environment comprising the steps of:

feeding the determined and specific magnitude for the heating element during the heating element testing-namely, the standard heat capacity $Q_N$ of the heating element and the heating element exponent n into a program memory of a microprocessor;

measuring the supply and return temperatures $T_V$ and $T_R$, as well as the ambient temperature $T_i$ which is influenced by the heat emission of the heating element feeding the values measured to the microprocessor as a process variable; and programming the microprocessor so that it processes the temperature values $T_V, T_R, T_i$ into a logarithmic excess temperature $\Delta T$ in accordance with the following equation $$\Delta T_k = \frac{T_V - T_R}{\ln \frac{T_V - T_i}{T_R - T_i}}$$

it produces a correction signal $T_K$ dependent on the difference on the supply and return temperatures $T_V - T_R$, as well as from two fixed values $b=60.1$ and $c=9$ in accordance with $$\Delta T = \frac{1}{60.1 - \frac{T_V - T_R}{9}}$$

increases $\Delta T$ and $\Delta T_K$ with the previously fed heating element constant n, multiplies them together and also with the heating element constant $Q_N$ and integrates over time, so that the output of the processor follows the following condition $$Q = \dot{Q}_N \int_{t_o}^{t_x} (\Delta T_k)^n \cdot (\Delta T)^n dt,$$

whereby Q is a quantitive value of the heat energy emitted from the heating element to the environment at all throttle conditions.

* * * * *